United States Patent
Bisson et al.

(10) Patent No.: US 9,158,865 B2
(45) Date of Patent: Oct. 13, 2015

(54) PROCESS, PROGRAM AND APPARATUS FOR DISPLAYING AN ASSEMBLY OF OBJECTS OF A PLM DATABASE

(75) Inventors: Pierre-Yves Bisson, Garches (FR); Arnaud Nonclercq, Reuil-Malmaison (FR)

(73) Assignee: Dassault Systemes, Cedex (FR)

( * ) Notice: Subject to any disclaimer, the term of this patent is extended or adjusted under 35 U.S.C. 154(b) by 131 days.

(21) Appl. No.: 12/795,212

(22) Filed: Jun. 7, 2010

(65) Prior Publication Data
US 2011/0137892 A1 Jun. 9, 2011

(30) Foreign Application Priority Data
Jun. 10, 2009 (EP) .................................. 09290430

(51) Int. Cl.
*G06F 17/30* (2006.01)
*G06F 17/50* (2006.01)
*G06T 15/06* (2011.01)
*G06T 19/00* (2011.01)

(52) U.S. Cl.
CPC ............... *G06F 17/50* (2013.01); *G06T 15/06* (2013.01); *G06T 19/00* (2013.01); *G06F 2217/04* (2013.01); *G06T 2210/12* (2013.01); *G06T 2219/2008* (2013.01)

(58) Field of Classification Search
CPC ................................. G06F 17/00; G06F 17/30
See application file for complete search history.

(56) References Cited

U.S. PATENT DOCUMENTS

| | | | | |
|---|---|---|---|---|
| 5,325,472 A | * | 6/1994 | Horiuchi et al. | 345/427 |
| 5,539,487 A | * | 7/1996 | Taguchi et al. | 396/330 |
| 5,633,993 A | * | 5/1997 | Redmann et al. | 345/419 |
| 5,761,674 A | * | 6/1998 | Ito | 1/1 |
| 5,822,587 A | * | 10/1998 | McDonald et al. | 717/108 |
| 5,864,333 A | * | 1/1999 | O'Heir | 345/157 |
| 5,900,879 A | * | 5/1999 | Berry et al. | 345/419 |
| 5,913,184 A | * | 6/1999 | Girbig | 702/182 |

(Continued)

FOREIGN PATENT DOCUMENTS

| | | |
|---|---|---|
| CN | 101017492 | 8/2007 |
| CN | 101226559 | 7/2008 |

(Continued)

OTHER PUBLICATIONS

Sudarsan, Rachuri, Steven J. Fenves, Ram D. Sriram, and Fujun Wang. "A product information modeling framework for product lifecycle management." Computer-aided design 37, No. 13 (2005): 1399-1411.*

(Continued)

*Primary Examiner* — Farhan Syed
(74) *Attorney, Agent, or Firm* — Hamilton, Brook, Smith & Reynolds, P.C.

(57) ABSTRACT

This invention is directed to a process, computer program and apparatus for displaying an assembly of objects of a product lifecycle management database. The method according to the invention aims at providing an access to the database, selecting the assembly of objects in the database, identifying a plurality of viewpoints on said assembly, retrieving from the database a set of objects of said assembly according to the plurality of identified viewpoints, computing a model of said assembly for all the retrieved objects of the set of objects, and displaying a view of the model, any displayed views being computed locally starting from the objects retrieved at the retrieving step.

19 Claims, 7 Drawing Sheets

(56) References Cited

U.S. PATENT DOCUMENTS

| | | | | |
|---|---|---|---|---|
| 5,963,664 | A * | 10/1999 | Kumar et al. | 382/154 |
| 6,014,145 | A * | 1/2000 | Bardon et al. | 345/427 |
| 6,016,147 | A * | 1/2000 | Gantt | 345/420 |
| 6,084,979 | A * | 7/2000 | Kanade et al. | 382/154 |
| 6,088,006 | A * | 7/2000 | Tabata | 345/7 |
| 6,094,196 | A * | 7/2000 | Berry et al. | 715/852 |
| 6,100,897 | A * | 8/2000 | Mayer et al. | 345/428 |
| 6,104,406 | A * | 8/2000 | Berry et al. | 345/427 |
| 6,108,664 | A * | 8/2000 | Nori et al. | 1/1 |
| 6,118,456 | A * | 9/2000 | Cooper | 345/619 |
| 6,121,971 | A * | 9/2000 | Berry et al. | 345/419 |
| 6,154,564 | A * | 11/2000 | Hashemi | 382/154 |
| 6,184,857 | B1 * | 2/2001 | Latham | 345/589 |
| 6,222,547 | B1 * | 4/2001 | Schwuttke et al. | 345/419 |
| 6,222,554 | B1 * | 4/2001 | Berry et al. | 345/427 |
| 6,263,100 | B1 * | 7/2001 | Oshino et al. | 382/154 |
| 6,266,068 | B1 * | 7/2001 | Kang et al. | 345/629 |
| 6,278,418 | B1 * | 8/2001 | Doi | 345/7 |
| 6,313,838 | B1 * | 11/2001 | Deering | 345/420 |
| 6,323,859 | B1 * | 11/2001 | Gantt | 345/419 |
| 6,379,249 | B1 * | 4/2002 | Satsukawa et al. | 463/31 |
| 6,470,482 | B1 * | 10/2002 | Rostoker et al. | 716/102 |
| 6,556,206 | B1 * | 4/2003 | Benson et al. | 345/473 |
| 6,573,903 | B2 * | 6/2003 | Gantt | 345/619 |
| 6,604,068 | B1 * | 8/2003 | Bukowski et al. | 703/22 |
| 6,803,912 | B1 * | 10/2004 | Mark et al. | 345/427 |
| 6,886,148 | B2 * | 4/2005 | Solomon | 716/139 |
| 6,917,370 | B2 * | 7/2005 | Benton | 345/633 |
| 7,133,880 | B1 * | 11/2006 | Nori et al. | 1/1 |
| 7,365,747 | B2 * | 4/2008 | Finlayson et al. | 345/427 |
| 7,620,638 | B2 * | 11/2009 | Nonclercq et al. | 1/1 |
| 7,710,420 | B2 * | 5/2010 | Nonclercq et al. | 345/440 |
| 8,013,854 | B2 * | 9/2011 | Delarue et al. | 345/420 |
| 8,473,524 | B2 * | 6/2013 | Chauvin et al. | 707/798 |
| 2002/0162081 | A1 | 10/2002 | Solomon | |
| 2004/0059657 | A1 * | 3/2004 | Kind et al. | 705/35 |
| 2005/0086236 | A1 * | 4/2005 | Chang | 707/100 |
| 2006/0098009 | A1 | 5/2006 | Zuniga | |
| 2006/0119601 | A1 * | 6/2006 | Finlayson et al. | 345/427 |
| 2006/0218478 | A1 * | 9/2006 | Nonclercq et al. | 715/500 |
| 2007/0013709 | A1 * | 1/2007 | Charles et al. | 345/581 |
| 2007/0159480 | A1 * | 7/2007 | Delarue et al. | 345/427 |
| 2007/0168392 | A1 * | 7/2007 | Delarue et al. | 707/104.1 |
| 2007/0198581 | A1 * | 8/2007 | Nonclercq et al. | 707/103 R |
| 2008/0098311 | A1 * | 4/2008 | Delarue et al. | 715/739 |
| 2009/0106530 | A1 | 4/2009 | Lauterbach et al. | |
| 2010/0274818 | A1 * | 10/2010 | Chauvin et al. | 707/803 |
| 2011/0137892 | A1 * | 6/2011 | Bisson et al. | 707/722 |
| 2011/0141109 | A1 * | 6/2011 | Radet et al. | 345/420 |
| 2011/0145760 | A1 * | 6/2011 | Radet et al. | 715/810 |
| 2011/0191365 | A1 * | 8/2011 | Betzler et al. | 707/769 |
| 2011/0295882 | A1 * | 12/2011 | Mascarenhas et al. | 707/769 |

FOREIGN PATENT DOCUMENTS

| | | |
|---|---|---|
| JP | 06-348787 | 12/1994 |
| JP | 10-512066 | 11/1998 |
| JP | 2003-006242 | 1/2003 |
| JP | 2007-213562 | 8/2007 |
| JP | 2007-220089 | 8/2007 |
| JP | 2007-220090 | 8/2007 |
| JP | 2008-56213 | 9/2008 |
| JP | 2008-203994 | 9/2008 |
| WO | WO 2004083983 | 9/2004 |
| WO | WO 2006/105416 A2 | 10/2006 |
| WO | WO 2006/105416 A3 | 10/2006 |

OTHER PUBLICATIONS

Rachuri, Sudarsan, Eswaran Subrahmanian, Abdelaziz Bouras, Steven J. Fenves, Sebti Foufou, and Ram D. Sriram. "Information sharing and exchange in the context of product lifecycle management: Role of standards." Computer-Aided Design 40, No. 7 (2008): 789-800.*

Ding, Lian, Alexander Ball, Jason Matthews, Christopher A. McMahon, and Manjula Patel. "Product representation in lightweight formats for product lifecycle management (PLM)." In 4th International Conference on Digital Enterprise Technology. University of Bath, 2007.*

Zheng, L. Y., Christopher A. McMahon, L. Li, Lian Ding, and J. Jamshidi. "Key characteristics management in product lifecycle management: a survey of methodologies and practices." Proceedings of the Institution of Mechanical Engineers, Part B: Journal of Engineering Manufacture 222, No. 8 (2008): 989-1008.*

Partial European Search Report for EP 09290430.9, Date of Completion Nov. 18, 2009.

European Search Report for EP 09290430.9, Date of Completion Mar. 19, 2010.

Chen, C-C, et al., "Viewcell-Dependent Geometry Simplification Using Depth", *Computer Graphics Workshop*, pp. 1-10 (Jun. 1, 2002).

Chisnall, D., et al., "Ray-driven Dynamic Working Set Rendering; for Complex Volume Scene Graphics Involving Large Point Clouds", *Visual Comput.*, 23(3):167-179 (Jan. 12, 2007).

Mühler, K., et al., "Viewpoint Selection of Intervention Planning", *Proceedings of the IEEE/Eurographics Symposium on Visualization*, pp. 267-274 (Jan. 1, 2007).

Sobierajski Avila, L. and Schroeder, W., "Interactive Visualization of Aircraft and Power Generation Engines", *Proceedings of the 8th IEEE Visualization '97 Conference*, pp. 483-486 (Oct. 24, 2007).

Tack, N., et al., "Pareto Based Optimization of Multi-Resolution Geometry for Real Time Rendering", *Proceedings WEB3D 10th International Conference on 3D Web Technology*, pp. 19-27 (Mar. 29, 2005).

* cited by examiner

PROCESS, PROGRAM AND APPARATUS FOR DISPLAYING AN ASSEMBLY OF OBJECTS OF A PLM DATABASE

RELATED APPLICATION(S)

This application claims priority under 35 U.S.C. §119 or 365 to European, Application No. 09290430.9, filed Jun. 10, 2009.

The entire teachings of the above application(s) are incorporated herein by reference.

FIELD OF THE INVENTION

The invention relates to the field of computer-implemented processes, programs, and more specifically to product life cycle management solutions, which comprise databases of data representative of modeled objects.

BACKGROUND

A number of systems and solutions are offered on the market for the design of parts or assemblies of parts, such as the one provided by DASSAULT SYSTEMES under the trademark CATIA. These so-called computer-aided design (CAD) systems allow a user to construct, manipulate and view complex three-dimensional (3D) models of objects or assemblies of objects. CAD systems provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are essentially specifications of geometry. Specifically, CAD files contain specifications, from which a geometry is generated, and from geometry a representation is generated. Specifications, geometry and representation may be stored in a single CAD file or multiple ones. CAD systems include graphic tools for representing the modeled objects to the designers; these tools are dedicated to the display of complex objects—the typical size of a file representing an object in a CAD system being in the range of a Mega-byte for part, and an assembly may comprise thousands of parts. A CAD system manages models of objects, which are stored in electronic files.

There also exists product life cycle management (PLM) solutions, such as the suite of products provided by DASSAULT SYSTEMES under the trademarks CATIA, ENOVIA and DELMIA; these solutions provide an engineering hub, which organizes product engineering knowledge, a manufacturing hub, which manages manufacturing engineering knowledge, and an enterprise hub which enables enterprise integrations and connections into both the engineering and manufacturing hubs. All together the systems delivers an open object model linking products, processes, resources to enable dynamic, knowledge-based product creation and decision support that drives optimized product definition, manufacturing preparation, production and service.

Such PLM solutions comprise a relational database of products. A database is usually defined as a collection of data (typically data and relations between the data) organized for rapid search and retrieval. Databases are structured to facilitate storage, retrieval, modification, and deletion of data in conjunction with various data-processing operations. Databases generally consist of a file or set of files that can be broken down into records, each of which consists of one or more fields. Fields are the basic units of data storage. Users retrieve database information primarily through queries. Using keywords and sorting commands, users can search, rearrange, group, and select the field in many records to retrieve or create reports on particular aggregates of data according to the rules of the database management system being used.

Using PLM solutions, a basic need of a user is to visualize a complex product made of thousand objects/parts and this, possibly according to different views or different viewpoints (virtual camera). The user may notably modify the viewpoint while viewing the modeled product being displayed, e.g. a sales engineer may whish to show an overview of a product to his customers.

The standard solution to this problem is to load in the client computer memory the whole model stored on the PLM database and corresponding to the assembly of said objects, including a three dimensional graphic representation of the model and all the information on said objects such as geometry, constraints . . . , but also hyperlinks to other objects. Thus, selection of individual parts is possible. However, in the field of PLM/CAD, the critical problem is that the global amount of visualization data is too large to fit in the client computer memory or at least too large for enabling a rapid display. Thus, due to the typical size of a file representing a CAD product (a product such as an airplane is likely to contain millions of parts, representing several giga-octets of memory), the rendering time of a view of said product may be cripplingly long. Furthermore, loading the whole model and/or selecting individual parts is not always necessary for a user, e.g. the sales engineer solely needs to show to his customers an overview of the product.

Another solution consists in navigating in a PLM database without loading the whole model. In this case, a viewpoint on a view of objects to be rendered is identified. Then, the view is rendered according to the identified viewpoint. To this aim, a plurality of locations in the view are determined, which are for example obtained according to a grid. Next, the database is queried and modeled objects are identified according to said locations. Typically, rays passing through the viewpoint and the locations are cast, and modeled objects intersecting the rays are identified. Meanwhile, the modeled objects identified are incrementally displayed in the graphical user interface so as to render a three dimensional view of the modeled objects.

However, this solution presents several drawbacks. First, the whole process must be repeated for each new viewpoint. When several new viewpoints are selected by the user on the client computer, the PLM database is queried several times, and resources (memory, CPU . . . ) of the server hosting the PLM database are continuously used, which can lead to a depletion of available resources of the server. Consequently, the responses to the queries cannot be provided in time, and as a result, the three dimensional view of the modeled objects cannot be displayed. Therefore, the visual navigation around the model, that is, the visualization of the model according to several successive viewpoints, is not user-friendly as the display of successive views lags; the transition between two views is not immediate or quasi-immediate. The visual navigation thus lacks of fluidity and ergonomics, and is time consuming for the user. Moreover, even if a new selected viewpoint was previously selected, the whole process has still to be repeated. Indeed, resources of the client computer are limited, e.g. the memory of the client is cleared as a new view is displayed.

Incidentally, the client computer of the user may be in communication through a product data management (PDM) system via a computer network such as a Local Area Network (LAN) or a Wide Area Network (WAN). Such a situation may occur when a sales engineer located outside of his office wishes to show a product (e.g. a 3D model) to a customer. Requests performed by the client computer pass over the network, and responses provided by the PDM system are also transported by the network. Again, the repetition of the whole process involves a huge consumption of the resources of the PDM system, but also a large consumption of the network bandwidth. As a result, the network is congested, and others networks parameters such as latency, delay, jitter, packet dropping probability, queuing delay, bit error rate are degraded. The network is overwhelmed and its overall performances strongly decrease.

Thus, according to the limitations of the existing solutions shortly discussed above, there is a need for an improved solution for displaying an assembly of objects of a product lifecycle management database, which decreases computation and/or network resources required to provide the display.

SUMMARY OF THE INVENTION

The invention therefore provides a process for displaying an assembly of objects of a product lifecycle management database. The process comprises
  providing an access to the database;
  selecting the assembly of objects in the database;
  identifying a plurality of viewpoints on said assembly;
  retrieving from the database a set of objects of said assembly according to the plurality of identified viewpoints;
  computing a model of said assembly for all the retrieved objects of the set of objects; and
  displaying a view of the model, any displayed views being computed locally starting from the objects retrieved at the retrieving step.

The process according to the invention may comprise one or more of the following features:
  objects are three-dimensional modeled objects and the computed model of the assembly of objects is a three-dimensional model displayed on a graphical user interface;
  the identified viewpoints are located outside the assembly of objects;
  objects of the retrieved set of objects are visible from viewpoints;
  prior to the step of retrieving from the database the set of objects, a step of computing rays passing through the identified viewpoints and the objects of the assembly of objects;
  the step of identifying a plurality of viewpoints comprises identifying faces of a bounding volume of the assembly of objects, and for each identified face of the bounding volume, identifying at least a viewpoint;
  prior to the step of retrieving a set of objects, a step of identifying one or more bounding volume for each respective object of the assembly of objects intersecting the computed rays;
  the computed rays pass through said identified faces with an angle of incidence ranging from 0 degree to 45 degrees;
  at the step of displaying, the view of the model is a non-associative view;
  prior to the step of displaying, a step of aggregating the objects of the retrieved set of objects to form the non-associative view,
  geometries of the objects of the retrieved set of objects are aggregated;
  the step of selecting the assembly of objects further comprises selecting a precision of the displayed view of the model;

the selected precision is proportional to a ratio between a number of rays passing through the identified face and the surface of the identified face;
  the precision is selected among one of the following:
  a default value;
  a value selected by the user;
  a value determined according to at least one parameter of a network;
  a value determined according to at least one parameter of a computer;
  the number of rays for each identified face is computed according to the selected precision;
  the step of selecting the assembly of objects further comprises selecting a configuration of the assembly;
  the step of retrieving from the database the set of objects is carried out according to security context of the user.

The invention further proposes a computer program stored on a computer readable medium, for displaying an assembly of objects of a product lifecycle management database, comprising code means for causing a computer to take the steps of the process of the invention.

The invention still concerns an apparatus for displaying an assembly of objects of a product lifecycle management database, the apparatus comprising computer means for implementing the steps of the process of the invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

A system embodying the invention will now be described, by way of non-limiting example, and in reference to the accompanying drawings, where.

DETAILED DESCRIPTION OF THE EMBODIMENTS

The invention is directed to a process for displaying an assembly of objects of a product lifecycle management (PLM) database. An access to the PLM database is provided, and an assembly of objects in the PLM database is selected. Typically, the assembly of objects is a product, and objects of the assembly are three-dimensional (3D) modeled objects.

Then a plurality of viewpoints is identified on the selected assembly. A viewpoint refers to a specific location from which a view of the assembly may be displayed. Next, a set of objects of the selected assembly is retrieved from the database according to the plurality of viewpoints identified. Then, a model of the selected assembly is computed for all the retrieved objects of the set of objects, and a view of the computed model is displayed, any displayed view being computed locally starting from the objects of the retrieved set of objects. Typically, the computed model of the assembly of objects is a three-dimensional (3D) model displayed on a graphical user interface.

The set of objects of the selected assembly is retrieved according to the plurality of identified viewpoints. As a result, the process of the invention is not limited to a specific viewpoint, e.g. a viewpoint selected by the user. Advantageously, the proposed invention takes into account the plurality of viewpoints: the computed model of the selected assembly is representative of the plurality of viewpoints. Hence, starting from the computed model, it is possible to display any views of the selected assembly without retrieving in the database new objects of the assembly. In other words, the computed model is a single model representative of a multiplicity of viewpoints.

The proposed invention is thus particularly advantageous as the set of objects required to compute the model is retrieved at one time by a client computer of a user, while the prior art involves querying the database each time a new viewpoint is selected. Therefore, the number of requests performed on the PLM database is drastically reduced, and hardware resources of the server hosting the database are preserved. Additionally, the proposed invention also preserves resources of the network: a single request is performed by the client computer so as to retrieve the set of objects instead of multiple requests, and thus, the consumption of network resources such as bandwidth is reduced. Moreover, a better visual navigation of the selected assembly is provided: once the computed model has been computed by the client computer, views of the assembly can be displayed starting from the computed model. As a result, the display of a view of the assembly of objects is faster, and the visual navigation is more fluid (has increased fluidity) and smoother.

Figure 1:
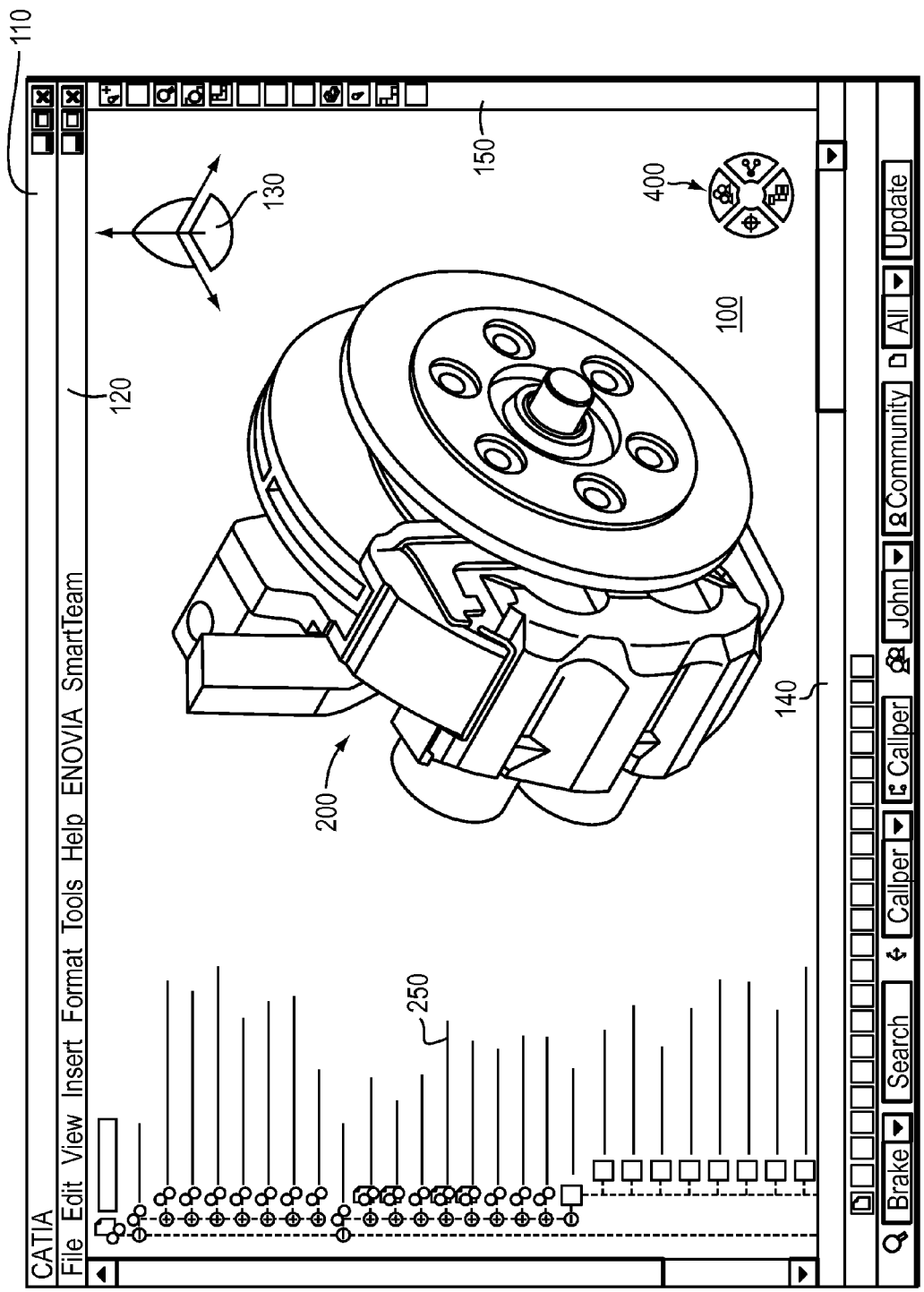
FIG. 1 is a display of a CAD-like graphical user interface.

In reference to FIG. 1, the exemplified graphical user interface (or GUI) 100 may be a typical CAD-like interface, having standard menu bars 110, 120, as well as bottom and side toolbars 140, 150. Such menu and toolbars contain a set of user-selectable icons, each icon being associated with one or more operations or functions, as known in the art.

Some of these icons are associated with software tools, adapted for editing and/or working on a modeled product 200 or parts of product 200 such as that displayed in the GUI 100. In the following description, "product", "part", "assembly" and the like may be referred to as "product" for the sake of simplicity. Note that the concept of "product" can in fact be generalized to that of "object", wherein an object can be only a "physical" part of the designed product or, more generally, any software tool participating in the design process (but not necessarily "in" the final product).

The software tools may be grouped into workbenches. Each workbench comprises a subset of software tools. In particular, one of the workbenches is an edition workbench, suitable for editing geometrical features of the modeled product 200. In operation, a designer may for example pre-select a part of the object 200 and then initiate an operation (e.g. change the dimension, color, etc.) or edit geometrical constraints by selecting an appropriate icon. For example, typical CAD operations are the modeling of the punching or the folding of a 3D modeled object displayed on the screen.

The GUI may for example display data 250 related to the displayed product 200. In the example of FIG. 1, the data 250, displayed as a "feature tree", and their 3D representation 200 pertain to a brake assembly including brake caliper and disc. The GUI may further show various types of graphic tool 130, 400, for example for facilitating 3D orientation of the object, for triggering a simulation of an operation of an edited product or render various attributes of the displayed product 200.

Figure 12:
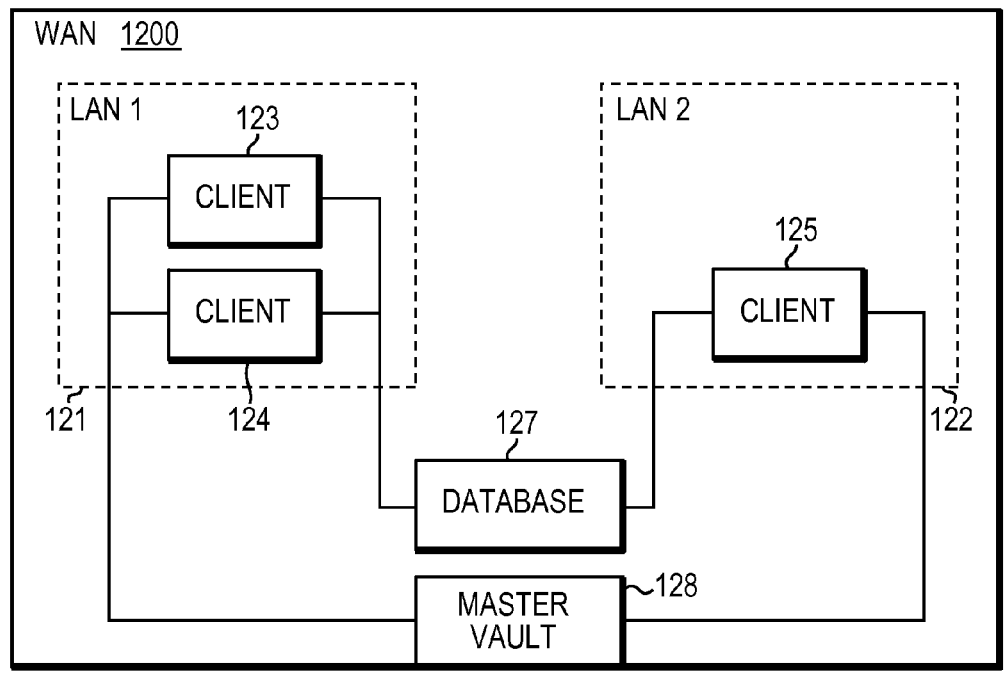
FIG. 12 is a schematic view of an embodiment of a network architecture adapted for carrying out the invention.

As an example embodiment, the process of the invention is implemented in a computer network comprising client computers and a product data management (PDM) system. FIG. 12 illustrates a schematic view of an embodiment of a network architecture adapted for carrying out the invention. The client computers are in communication through the PDM system, allowing for the management of numerous documents, relations and data, possibly hierarchically interrelated. The PDM system may for example be located at a backbone of the network. Such a PDM system utilizes a database having data related to modeled objects, which are likely to be edited by a designer. A plurality of users may thus work in a collaborative way, on different objects (for example parts, products or assemblies of parts), as illustrated on FIG. 12.

Besides, the GUI 100 and associated CAD/CAM/CAE application may be designed for allowing access to the PLM database, either on client computers request or as a background task. Thus, in operation, a user who wishes to access the database does not have to pass from a first CAD window to a PDM window (for example by minimizing the first window and maximizing the second window) and then go back to the CAD window. Such window switching operations, frequently carried out by designers, are time consuming and particularly inappropriate in the field of CAD/CAM/CAE.

The GUI 100 is run on one client computer of the network, having a display and memory. For instance, GUIs similar to that identified by reference numeral 100 displayed in FIG. 1 may be run on other client computers of the network. These computers may further benefit from similar local CAD/CAM/CAE applications and, more generally, a common environment.

Figure 2:
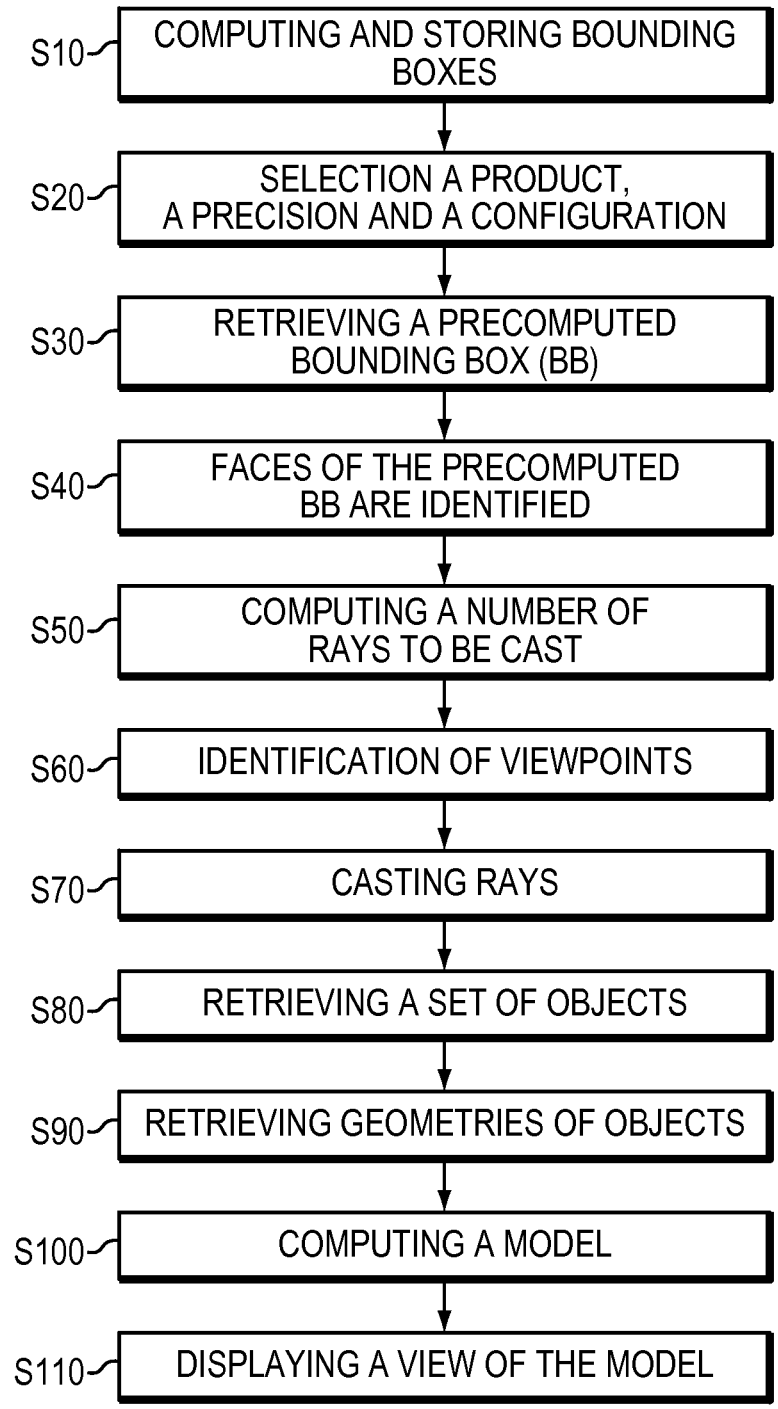
FIG. 2 shows a flowchart reflecting the underlying steps of the process of the invention.

Referring now to FIG. 2, the process broadly decomposes as a build time (step S10) and a run time (steps S20-S110). The build time is mainly dedicated to bounding volumes computation and, possibly, to the creation of an index of the objects. As a result, the step S10 provides to the next steps pre-computed bounding volumes stored on a database, typically a PLM database. Thus, the client computer of the user does not need to compute itself bounding boxes, saving time and client resources thereby.

By "bounding volume", or bounding boxes, it is meant any mathematically simpler surface enclosing an object, for example for the purposes of culling or intersection tests. In practice, objects are three-dimensional modeled objects, and typical bounding volumes of the objects are for example cubes, cylinder boxes or spheres. Use is made of bounding boxes in the following.

Bounding boxes of respective objects to be displayed are computed and subsequently stored in the PLM database. Such bounding boxes are stored together with a relation to their corresponding object. Geometric definitions of objects can be used to compute said boxes. The definitions used may either be the complete definitions or simplified definitions, such as the definitions of tessellated representations of said objects.

Preferably, one uses definitions of tessellated representations, which gives rise to faster computation times.

Considering a product as a hierarchy of objects, e.g. a tree, it is for example first computed boxes pertaining to terminal nodes of the tree. Product structure definitions are then used to compute (step S10) the boxes of an assembly of objects, thanks to the definition of the structure and the terminal boxes already generated.

Furthermore, subdivided boxes are computed and stored in the database, together with respective parent bounding boxes. Parent bounding boxes are in this case the parent nodes of an octree, that is, a tree data structure wherein each parent node has eight child nodes, which together partition the volume of space of the parent node. Thus, each node of the tree represents a cuboid volume, e.g. a subdivided bounding volume. Several subdivisions can be contemplated (parents, children, children's children, etc.), depending on the desired resolution.

Moreover, only one bounding box is preferably stored for multi-instantiated objects of the set of objects. That is, bounding boxes are computed for the references only. In this case, instances of a same reference are likely to be stored together with a position matrix (or a link thereto). Hence, in operation, a box may be equated on-the-fly to any of the multi-instantiated objects upon a simple Cartesian system change. Moreover, resources are saved on the database as less bounding boxes are stored on the database.

The process further comprises a step S20 consisting in selecting a product, a precision, and a configuration. Typically, a product is comprised of an assembly of objects. The selection of the product may for instance be done thanks to the use of a tree, such as the one 250 of FIG. 1. It is also possible for the user to select the product thanks to another type of user interface, for instance by inputting identification information for the product, by selecting the product in a list, or the like.

The selection of the precision and the configuration of the displayed view of the model may be performed thanks to any kind of user interface such as a combo-box, an icon, a special command or a right click, or the like. Furthermore, the precision and/or the configuration may be selected by default.

The precision reflects the degree of refinement with which the view of the model is displayed, that is, an accuracy of the view. The accuracy of the view involves exactness and quality of the view. For instance, a modern airplane may require up to 3 millions objects. Depending on the selected precision, a view of the airplane will show or not the rivets of the fuselage.

The precision may be represented by a numerical scale, from 0 for a less accurate display to 9 for a very accurate display.

Typically, the precision may contribute to reduce the resources required to perform the process of the invention. Indeed, the precision allows determining the hardware resources required to display the view. Less accurate is the display, less resources are required to retrieve from the database the set of object, compute the model, and display a view of the model; conversely, more accurate is the display, more resources are required to retrieve the set of object, to compute the model, and to display a view of the model. In addition, the time required to display a view of the model depends on the selected precision; the less accurate the display, the quicker is the display rendering of the view, and the more accurate the display, the slower is the display rendering of the view.

Advantageously, the selection of the precision makes it possible to display a view of the model even if the client computer has limited resources, e.g. a sales engineer may launch the display of the model view on a laptop computer which has fewer resources than a workstation. Thus, the process of the proposed invention may be adapted to hardware constrains. Precision will be further detailed in the description.

The configuration is an arrangement of the product or of objects of the product. The configurations could be for example commercial configurations, e.g. including different colors and material available for the product. For instance, a model of a car may have hundreds of configurations based on the combinations of elements such as the car style (coupe, convertible, . . . ), the type of transmission (manual, auto, . . . ), exterior and interior options (colors, wheel type, seat style, radio, . . . ).

The selection of the configuration thus allows the user to show a product according to the whishes of the customer, that is, according to the whished configuration.

Next, at step S30, a precomputed bounding box of the product is retrieved from the PLM database, e.g. a cube enclosing the selected product is retrieved. Typically, the server hosting the PLM database retrieves the bounding box and stores it in memory. One understands that storing a bounding box in memory is advantageous compared to storing an object in memory since a bounding box is described by less data than its object; memory is thus preserved.

Next, at steps S40-S60, the process identifies a plurality of viewpoints on the selected assembly. Typically, these steps are performed by the server hosting the PLM database, e.g. the PDM system. Such step is detailed now, according to some specific embodiments of the invention.

At step S40, faces of the precomputed bounding box of the selected product are identified. This step is performed as well known in the art.

At step S50, it is computed a number of rays or any geometrical equivalent for each identified face of the bounding box of the product according to the selected precision at step S20. The precision is proportional to a ratio between a number of rays passing through the identified face and the surface of the identified face. The number of rays computed for each face of the bounding box of the selected product is thus proportional to a multiplication between the surface of the identified face and the selected precision. The proportionality between the number of rays computed and the multiplication may be determined via a constant of proportionality. The constant of proportionality may be:

a default value, no data input that have to be carried out;

a value selected by the user, the selection being performed via means that may be similar to those used for selecting the product, the precision and the configuration;

a value determined according to at least one parameter of a network such as bandwidth, latency, delay, jitter, packet dropping probability, queuing delay, bit error rate, the determination of the value being made so that a value representative of the one or more network parameters does not exceed a given threshold. Thus, the selected precision may limit the impact of the process on the network and the process may then be adapted to the network;

a value determined according to at least parameter of the client computer such as CPU resource available, memory resource available, the determination of the value being made so that a value representative of the one or more client computer parameters does not exceed a given threshold. Similarly, the selected precision may limit the impact of the process on the client computer of the user, and therefore, the process of the invention may be adapted to the hardware resources of the client computer.

Then, at step S60, the identification of viewpoints is carried out. A viewpoint is a specific location from which a view of the assembly of objects may be displayed. A viewpoint is representative of a location of a virtual camera in a scene wherein the assembly of objects is also located. The scene is a space in which spatial relationships between objects are described. The scene is comprised of at least one object, and the object(s) may be modeled object(s) or three-dimensional (3D) modeled object(s). Thus, if the scene is comprised of 3D modeled objects, the scene is a 3D space. Therefore, an assembly of objects or a product may comprise a multiplicity of viewpoints.

Preferably, the identified viewpoints are located "outside" of the product. A viewpoint is located "outside" a product when the viewpoint is in contact or is not within any one of objects of the product. Thus, the viewpoint is outside when it is beyond an enclosure or boundary formed by the product.

The identification of the plurality of viewpoints may comprise identifying faces of a bounding volume of the assembly of objects and identifying at least a viewpoint for each identified face of the bounding volume. In this case, a viewpoint is located "outside" a product when the viewpoint is in contact or is not within the bounding box of the product (which encloses the bounding boxes of the objects of the product). Therefore, the viewpoint is located "outside" the product when it is situated in a place beyond an enclosure or boundary of the bounding box of the product.

One understands that identifying viewpoints located outside the product allows focusing on the objects which are located at the periphery of the product. Therefore, the model computed at step S100 will allow a visual navigation around the product, that is, the visualization of the model according to several successive viewpoints located outside the selected product.

Preferably, the number of identified viewpoints for each identified face of the bounding box is inferior or equal to the number of rays computed at step S50 so as to limit the number of identified viewpoints.

Advantageously, the number of viewpoints for each identified face of the bounding box is determined based on an average number of rays that shall pass through each viewpoint. The average number of rays that shall pass through each viewpoint may be determined by default, or selected by the user. The selection of the average number of rays may for instance be done in a similar way as for the selection of the precision or configuration.

At step S70, rays or any geometrical equivalent passing through the identified viewpoints and faces of the precomputed bounding box of the selected product are computed or cast.

Then, at step S80, a set of objects of the selected product is retrieved from the database according to the plurality of identified viewpoints. To this aim, it is identified one or more bounding boxes for each respective object of the product intersecting the computed ray.

Typically, prior to identifying the bounding boxes intersecting the computed ray, bounding boxes of the objects of the selected product are retrieved from the database and may be stored together, e.g. in memory of the server hosting the PLM database. Retrieval of the bounding boxes of the objects may be carried out thanks to the product structure and the relations between the objects thereon.

Figure 5:
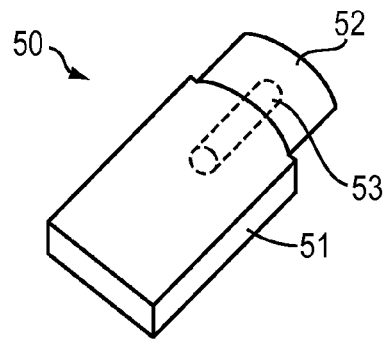
FIG. 5 is a schematic view of a view of a set of objects displayed in a GUI according to FIG. 1.
Figure 6:
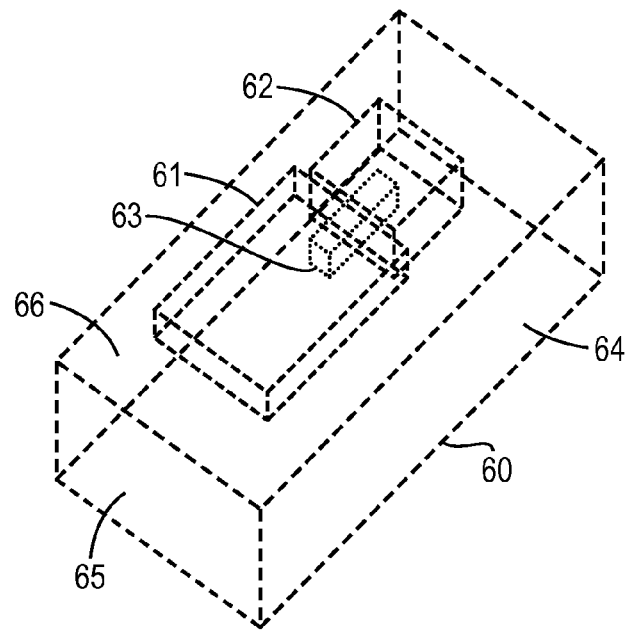
FIG. 6 is a schematic view of a view of bounding boxes of a set of objects according to FIG. 5.

The FIG. 6, in relation with FIG. 5, illustrates the retrieval of the bounding box of the selected product carried out at the step S30, and also the retrieval of the bounding boxes of the objects of the product. FIG. 5 depicts a product 50 which is composed of three objects: a parallelepiped 51 placed side by side with a cylinder 52, the parallelepiped 51 and the cylinder 52 being fit together by a stem 53. The stem 53 is shown with dotted lines as it is enclosed in the parallelepiped 51 and the cylinder 52. FIG. 6 illustrates four bounding boxes which are retrieved: a bounding box 60 pertaining to the product 50 and retrieved at the step S30, three bounding boxes 61, 62, 63 enclosed by the bounding box 60, respectively related to the parallelepiped 51, the cylinder 52 and the stem 53, and retrieved prior to identifying the bounding boxes intersecting the computed ray.

Notice that the bounding boxes are depicted on dotted lines in FIGS. 6, 7, 8 and 9, as a guide for the eyes only.

Several known techniques might be used to determine whether an intersection exists or not. For example, thanks to the viewpoint and the identified face, it may be determined whether the ray intersects a bounding box.

One understands that computing intersections between bounding boxes and computed rays is advantageous compared to a solution consisting on computing intersections on objects of the selected product. Indeed, a bounding box is a mathematically simpler surface enclosing an object and its coordinates in a Cartesian system are simple, thus facilitating the determination of an intersection. Therefore, computing intersections between bounding boxes and computed rays requires fewer resources; especially, memory of the PDM system is preserved.

In a brute force method, the algorithm may for example scan all bounding boxes in order to determine which boxes intersect said computed ray. This step is carried out in the coordinate system of the reference view.

However, the above scan step becomes rapidly prohibitive as the number of objects of the assembly of objects increases. For example, CAD/CAM modeling of a modern airplane may require storing up to 3 millions boxes. Hence, one understands that it would be advantageous to speed up the intersection research algorithm.

In this respect, one may for example use the so-called R-tree technique, that is, a spatial access method, wherein space is split with hierarchically nested, possibly overlapping, boxes. Such a technique leads to more balanced trees according to various possible criteria, leading to more efficient scans.

Next, once an intersection with a child instance of the identified viewpoint has been found, the initial ray is recomputed in the coordinate system of said intersected child instance and a new scan is performed within child instances thereof, etc. until no more intersection is found.

Figure 3:
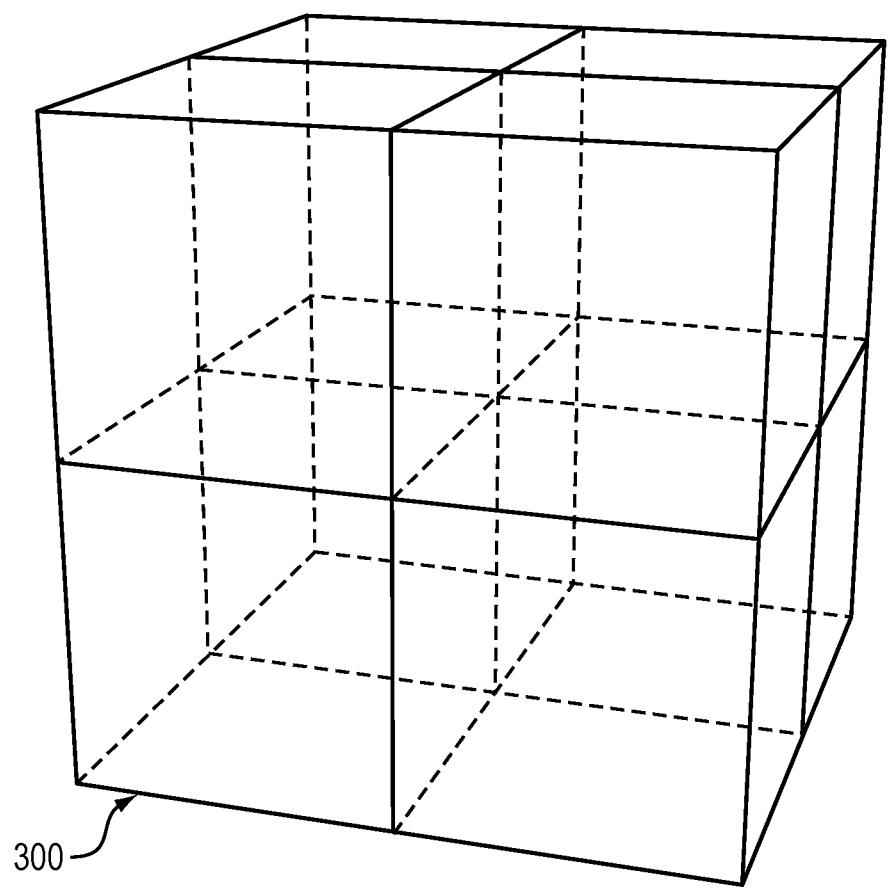
FIGS. 3 and 4 are a schematic view of an octree used in the process according to an embodiment of the invention.

The intersection research algorithm is thus recursive, that is, it is searched the last intersected child of an nth-order intersected parent box, and runs as follows:

Once an intersecting bounding box is detected, the process according to one embodiment works at a smaller subdivision level within the intersected bounding box. For example, one may consider the octrees, which are volumes dividing in eight a cubic box as shown in FIG. 3.

Figure 4:
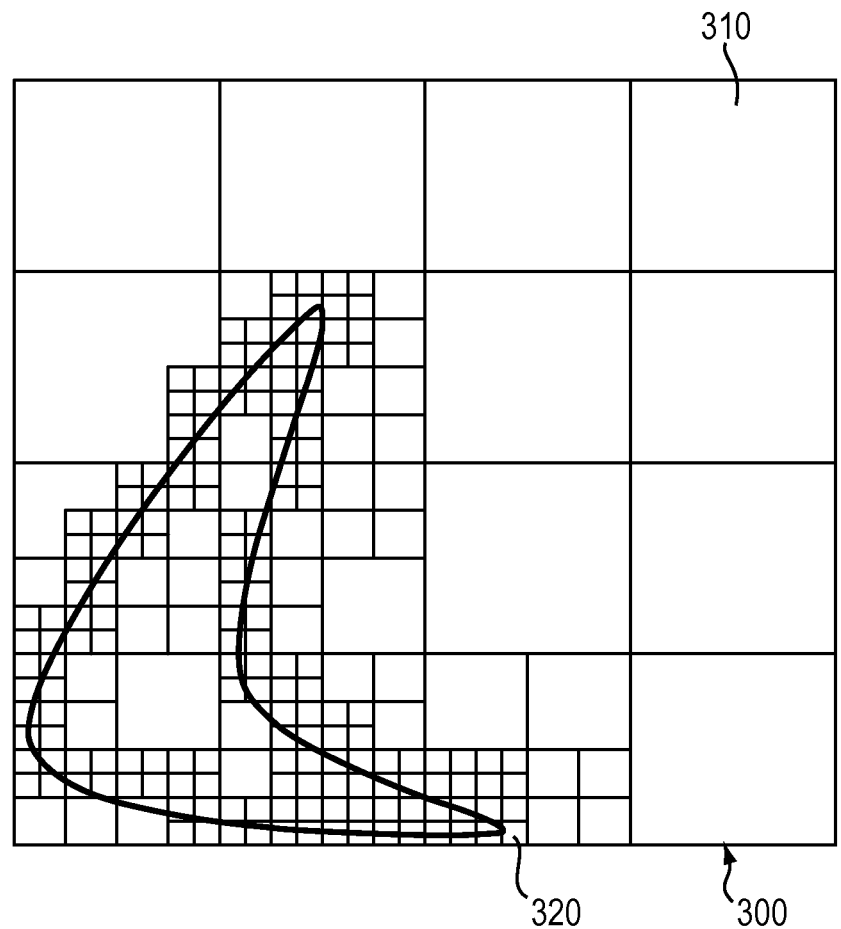

Octrees 300 are themselves for example further subdivided, as shown in FIG. 4 (represented in two dimension for the sake of clarity) except if an octree 310 does not contain any element of a model or is completely filled with an element of a model. Each octree 300 containing an element of the model is further subdivided.

The octrees 300 are therefore scanned to detect any intersection with the computed ray, until the smallest undivided volume, known as a voxel 320 (which size may for instance depend on the definition input by the user). The process then stops and the object in the view that is inside (or close to) the identified voxel is selected.

One understands that it is advantageous to use smaller subdivision levels within the intersected bounding box such as octrees and voxels. Indeed, memory and CPU resources of the PDM system are preserved since octrees and voxels have mathematically simpler surfaces as illustrated on FIG. 3, and thus the computing of an intersection between the computed ray and one of these mathematically simpler surfaces is facilitated.

Once an object is selected, it is determined if the object is visible from the viewpoint or not. An object is visible when it is not completely hidden by another object. Then, the process recursively tests other bounding boxes according to the same steps (bounding boxes, octrees, voxels) to find and select the object that would be visible from the viewpoints. In order to optimize the process, if a bounding box does not intersect the computed ray (in the new coordinate system), then this bounding box is discarded. Similarly, if a bounding box is intersected by the ray but if, meanwhile, the object of the bounding box is not visible from at least one of the identified viewpoints, then said bounding box will be discarded.

Note that the bounding box of the product is a particular bounding box. Indeed, it does not necessarily comprise objects, but solely bounding boxes of the objects of the product. Thus, even if the bounding box of the product is intersected by the computed rays, any object may be selected. In order to optimize the process, the intersection research algorithm does not apply to the bounding box of the product, but solely applies to the bounding boxes enclosed by the bounding box of the product and their respective octrees and voxels.

Moreover, the bounding box of the product is mainly used to identify a volume in the scene wherein the selected product is located. This volume advantageously limits a space towards which computed rays have to be cast. Typically, the bounding box of the product is as small as possible, that is, its volume is the minimal bounding box which can enclose bounding boxes of the objects of the product.

Once all the bounding boxes have been tested and at least one object been identified in the database, the identified object is stored. To this aim, information related to the identification of the object (e.g. the name of the object) is stored on a file. Such a file may form for instance an index which comprises the set of objects of the selected product retrieved from the database according to the identified viewpoints. Typically, the index is retrieved by the client computer.

Preferably, the computed rays may pass through identified faces with an angle of incidence substantially normal to the faces of the bounding box of the product. In practice, only one ray having an angle of incidence substantially normal to a face is computed for a given viewpoint. Indeed, for a given viewpoint, computing or casting a ray having the same angle of incidence than another one is useless since the second ray would intersect the same bounding boxes as the first ray.

Figure 7:
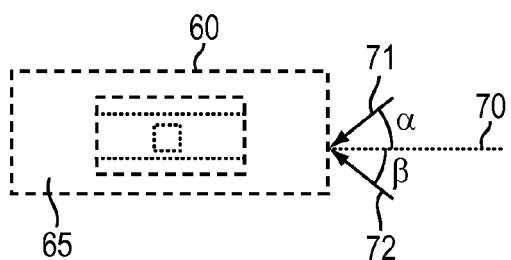
FIGS. 7 and 8 are schematic front views of bounding boxes according to FIG. 6.
Figure 8:
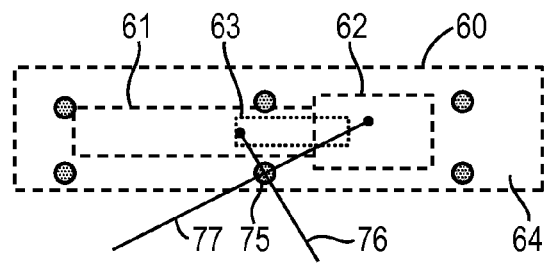

The angle of incidence is the angle between a ray incident on a face and a line perpendicular to the face at the point of incidence, as depicted on FIG. 7. FIG. 7 is a schematic view of a front view of a face 65 of the bounding box 60 of the FIG. 6. It is depicted two rays 71 and 72 having an angle of incidence, respectively the angle noted α and the angle noted β. The angle of incidence of each one of the rays 71 and 72 is defined in comparison with a line 70 perpendicular to the surface at the point of incidence.

Advantageously, the computed rays may pass through identified faces with an angle of incidence ranging from 0 degree to 45 degrees. Referring back to FIG. 7, the angles α and β may take values comprised between 0 and 45 degrees. It results that the identification of one or more bounding boxes of a respective object of the product intersecting computed rays is improved. Indeed, it provides the capability to identify bounding boxes that, otherwise, would not be identified, as depicted on FIG. 8 which is a schematic view of the front view of the face 64 of the bounding box 60 on FIG. 6. Each point drawn on the face 64 represents a point of incidence of a computed ray passing through the face 64 with an angle of incidence substantially normal. Now, one focuses on the point of incidence noted 75. The computed ray normal to the point of incidence 75 (not represented) does not intersect any of the three bounding boxes 61, 62, and 63 enclosed by the bounding box 60. Two computed rays 76 and 77 passing through the point of incidence 75 are represented. Thanks to its angle of incidence, the computed rays 76 (respectively 77) intersects the bounding box 61 (respectively 62). Furthermore, according to the intersection research algorithm, the bounding box 63 is not retrieved as the related object 53 is completely hidden by the objects 51 and 52. The object 53 is not visible from any of the identified viewpoints, and thus the object 53 is not an object of the set of objects retrieved from the database.

Preferably, retrieving from the database the set of objects is carried out according to security context of the user. Thus, the identification of the bounding boxes and the objects thereon may satisfy user security contexts. User security contexts are related to access control, that is, the ability to permit or deny the use of a particular resource by a particular user. Typically, a user may be allowed or not to read, and/or write, and/or execute (e.g. display) an object. For instance, a modeled object may be locked by the designer who has the responsibility of the modeled object, which means that other users are not allowed to modify the modeled object until the designer unlocks the modeled object. Moreover, a person who is not the designer may not be allowed to access the complete modeled object. Furthermore, the access control may also be based on the physical location of the user, e.g. the user may not be allowed to display a product when he's not located in his office.

Then, at steps S90-S100, the process computes a model of the selected product for all the retrieved objects of the set of objects. Preferably, the model is computed by the client computer of the user. Thus, the PDM system is not in charge of the computing of the model and its resources are thus not consumed.

At step S90, geometries of the set of objects are retrieved. Objects of the set of objects are identified thanks to the index storing the set of objects of the selected product. Then, for each of the objects of the index, geometries are searched and retrieved within their respective objects; a logical pointer to the object may be used.

Geometries are the different types of elements constituting an object. These may include vertices, edges, faces, polygons and surfaces.

The retrieval of geometries of an object instead of the complete object is advantageous as the quantity and the number information to retrieve is limited. Indeed, an object is comprised of geometries, but also of metadata such as the user security context, properties of the objects, e.g. date of creation, last modification, designer in charge of the object. As a result, the bandwidth of the network is preserved, and the client computer has less information to compute.

Then, at step S100, a model of the selected product is computed based on the retrieved geometries. The computed model is a representation of the set of objects of the selected product retrieved according to the identified viewpoints. In other terms, the computed model is a representation of the objects visible from the identified viewpoints which are located outside the selected product.

In practice, the model is a three-dimensional (3D) model displayed on a graphical user interface, and it is made of a collection of points in the 3D space, connected by various geometric entities such as triangles, lines, curved surfaces, etc. . . . , as known in the art.

Preferably, the geometries of the objects of the retrieved set of objects are aggregated in order to form a non-associative view of the model. A non-associative view means that the graphical elements forming the view are not partitioned according to the individual parts of the set of objects, from the system standpoint. Thus, the set of objects as represented in the view is not content addressable and a user may not select any individual object composing the set displayed in the view. For example, neither a bitmap nor raster image is content addressable with respects to represented objects. A vectorial view is conceptually different as it is partitioned into various drawing elements. It is notwithstanding an example of non-associative view in the sense of the invention inasmuch as the drawing elements are not associated to the various objects of the set of objects stored in the PLM database.

Next, at step S110, a view of the model is displayed. Importantly, any displayed views of the model are computed starting from the objects retrieved at the retrieving step S80. Thus, it is possible to display any view of the selected product without repeating any of the step S10 to S100 of the process depicted on FIG. 2. Indeed, the set of objects of the selected product is retrieved according to a plurality of viewpoints. Therefore, starting from a unique request, it is possible to retrieve all the objects of the set of objects of the product. The model of the product is computed based on the objects of the retrieved set of objects, and as a result, the visual navigation around the product, that is, the display of a succession of views of the product, solely relies on a single computed model. The computed model is a single model representative of a multiplicity of viewpoints.

The process according to the invention is thus particularly advantageous since the model is computed at one time. Moreover, hardware resources of the server hosting the PLM database and network resources are preserved since the computation is made on the client computer side. The visual navigation of the selected product is thus improved and views are displayed faster. The visual navigation is more fluid while fewer resources are required to perform the visual navigation. Globally, the system is enhanced. For instance, the time required by the proposed invention for displaying a view of the model is around 1 second, while this time is around 30 seconds in the prior art.

Figure 9:
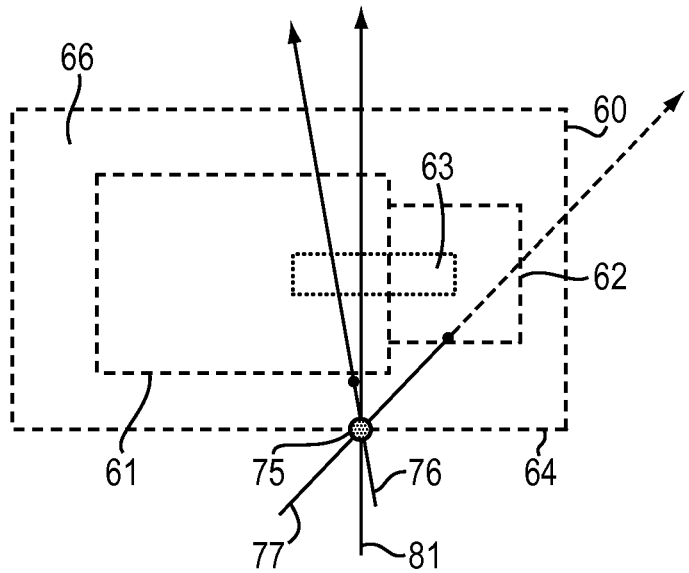
FIG. 9 is a schematic top front view of bounding boxes according to FIG. 6.

An embodiment of the above process is illustrated now, in reference to FIG. 9, depicting a top front view of the bounding boxes depicted on FIG. 6.

The proposed invention is directed to a process for displaying an assembly of objects of a product lifecycle management database.

Figure 10:
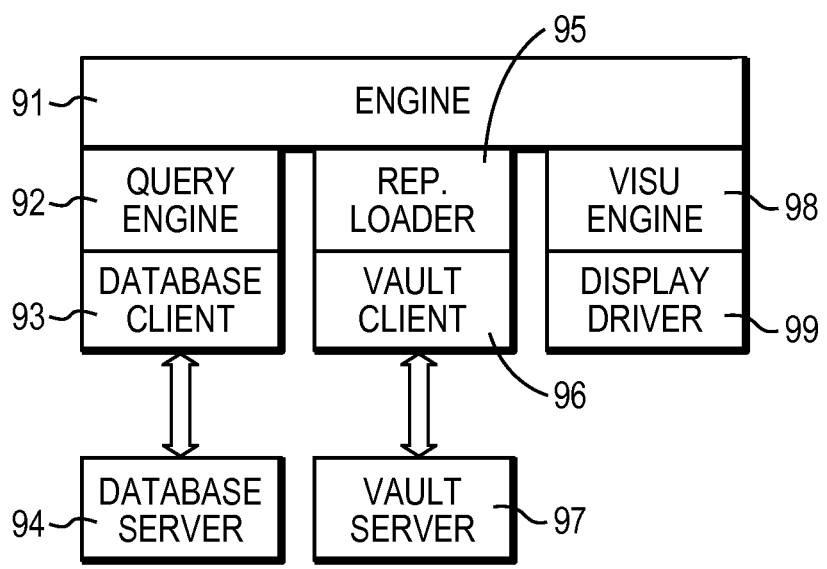
FIG. 10 is a schematic view of a software architecture usable for carrying out the invention.

First, an access to the database is provided thanks to a dedicated software architecture such as the one depicted on FIG. 10.

Then, the assembly of objects is selected. Typically, a product is selected.

Next, a plurality of viewpoints is identified on the selected assembly of objects. In practice, the identification of the viewpoint comprises the identification of faces of the bounding volume of the selected assembly of objects. For instance, the faces 64 and 66 of the bounding volume 60 are identified. Altogether, the 6 faces of the bounding volume 60 are identified. Then at least one viewpoint is identified for each identified face. Here, the viewpoint 75 identified for the face 64 is represented.

Preferably, viewpoints are located outside the assembly of object. A viewpoint is located "outside" of the product when the viewpoint is in contact or is not within anyone of objects of the product, or is in contact or not within the bounding box of the product (which encloses the bounding boxes of the objects of the product) if a bounding volume of the assembly of object is identified.

In practice, identified viewpoints are located on the identified faces of the bounding volume of the assembly of the object, e.g. the identified viewpoint 75 is located on the face 64 of the bounding box 60. The distribution of the viewpoints on the faces may be random, or on the contrary may be definite. In the case of a definite distribution of the viewpoints, the distribution may be homogenous or heterogeneous. A homogeneous distribution involves that the viewpoints are uniformly distributed on the face. A heterogeneous distribution involves that the viewpoints are irregularly distributed on the face; the heterogeneous distribution is decided according to at least one parameter or function, contrarily to the random distribution wherein any parameter is involved. For instance, the heterogeneous distribution may be determined according to a function representative of a distance from the edges of an identified face; fewer viewpoints could be located near the edges.

Then, a set of objects of the assembly is retrieved from the database according to the plurality of identified viewpoints. According to the process, a query on the database is triggered. Rays passing through identified viewpoints and objects of the assembly are computed.

Typically, rays pass through the viewpoints and bounding boxes of the objects of the assembly. One or more bounding boxes are identified for each object of the assembly of objects intersecting the computed rays. For each identified bounding box, an object is retrieved, thus forming the set of objects.

In reference to FIG. 9, rays 76, 77 and 81 pass through the viewpoint 75 located on the face 64 and the bounding box 60. The bounding boxes 61 and 62 are respectively intersected by the rays 76 and 77. Respective objects of the bounding boxes 61 and 62 are identified and selected. Continuation of the rays 76 and 77 (after the intersections of bounding boxes 61 and 62) is represented by dotted lines. In particular, the ray 76 also intersects the bounding box 63 which is not identified and selected. Indeed, objects of the retrieved set of objects are visible from viewpoints. However, the object of the bounding box 63 is not visible from the viewpoint 75 since it is hidden by the objects of the bounding boxes 61 and 62. Therefore, the object of the bounding box 63 is not selected and not stored.

Actually, whatever the identified viewpoint might be, the object of the bounding box 63 is always hidden by the objects of the bounding boxes 61 and 62, and therefore, the bounding box 63 will be discarded. On the contrary, if the object of the bounding box 63 was visible from at least one viewpoint, then the object would be selected.

Next, a model of the selected assembly is computed for all the retrieved objects of the set of objects; the model is computed for the objects of the bounding boxes 61 and 62.

Then, a view of the model is displayed, any displayed views being computed starting from the objects retrieved at the retrieving step. In reference to FIG. 5, a view of the computed model is displayed. Note that the object 53 represented with dotted line is not part of the computed model since its bounding box 63 was discarded.

For the sake of explanation and clarity, the FIG. 9 is simple and solely comprises one object hidden by others. One understands that a typical product such as an airplane contains millions of objects, and that a large number of objects are hidden. In practice, a view of the product displayed according to the process of the proposed invention is an external view of the product. Referring back to the example of the airplane, views of the computed model of the airplane allow to navigate around the airplane and show mainly the fuselage, wings, vertical and horizontal stabilizers, jet engines, . . . and so on. A plurality of external views is displayed. However, the seats in the fuselage, the tanks in the wings, fuel injectors in the jet engine . . . etc, are objects entirely hidden. Thus, according to the proposed invention, they are not displayed in the external views generated by the process of FIG. 2.

It is to be understood that the foregoing method can be applied to any object in any configuration capable of being defined by a CAD/CAM/CAE system, or any system used to display views of an object from varying viewpoints. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language or in assembly or machine language if desired; and in any case, the language may be a compiled or interpreted language.

FIG. 10 is a schematic view of a software architecture usable for carrying out the invention; it shows a single client computer of a user, a database server 94 and a vault server 97. The client computer comprises an engine 91, which manages user interface and controls components 92, 95 and 98. The engine 91 makes it possible for the user, but is not limited to, to select objects, a product, a configuration, a precision, and types of views for displaying a model.

FIG. 10 further shows query engine 92, database client 93 and database server 94. Query engine 92 is controlled by the single client; it builds database statements depending on user's commands and passes the database statements to database client 93. Query engine 92 also manages query results received from database client 93.

Database client 93 is adapted to manage database server connection. It receives queries from query engine 92 and passes the queries to database server 94. It receives query results from database server 94 and passes these results to query engine 92.

Database server 94 may receive queries from several database clients, such as client 93, and serves these queries. Database server 94 is typically a relational database and may be implemented using the solutions available from IBM under reference DB2 or available from ORACLE. The database could also be an object or XML database, or an application server accessing a database. Said application server may also provide processing (on the fly or asynchronously) for advanced query (proximity query, spatial query . . . ).

Apart from the additional graphical navigation functions available to the user in the engine 91, components 92, 93 and 94 need not differ from a relational database of the art, like the ones used in PLM solutions. Accordingly, these components are not detailed further.

FIG. 10 further shows a vault server 97, for storing and providing representations of objects contained in the database; in other words, the vault server is used as a representations repository. Vault server 97 may be a file server, whereby representations could be stored in various files. It could also be implemented using a database server, using for instance "blob" (binary language object) storage. It could also use proxy and/or cache technologies. The representations of objects stored in the vault server may exist in various formats, e.g. bounding-box, polygons, bitmap images, vector images, subdivision surfaces or more generally any format known in the art. It is advantageous, to store various formats in the vault server 97, for allowing incremental loading of representations.

The vault server is addressed thanks to a vault client 96. The vault client 96 makes it possible for the client to address the vault server 97 for retrieving representations of objects. FIG. 10 also shows a representation loader 95. Representation loader 95 queries vault server 97, through vault client 96, for obtaining the representations of the objects to be displayed to the user. In addition, representation loader 95 may also manage representation incremental loading, upon receiving representations from vault client 96.

Visualization engine 98 manages representation display to the user. It addresses display driver 99, which manages the display hardware—the graphic card, in most instances. For the purpose of displaying representations on the display hardware, one may use accelerated hardware, through an OpenGL driver, or using Microsoft Direct 3D, or DirectX.

Figure 11:
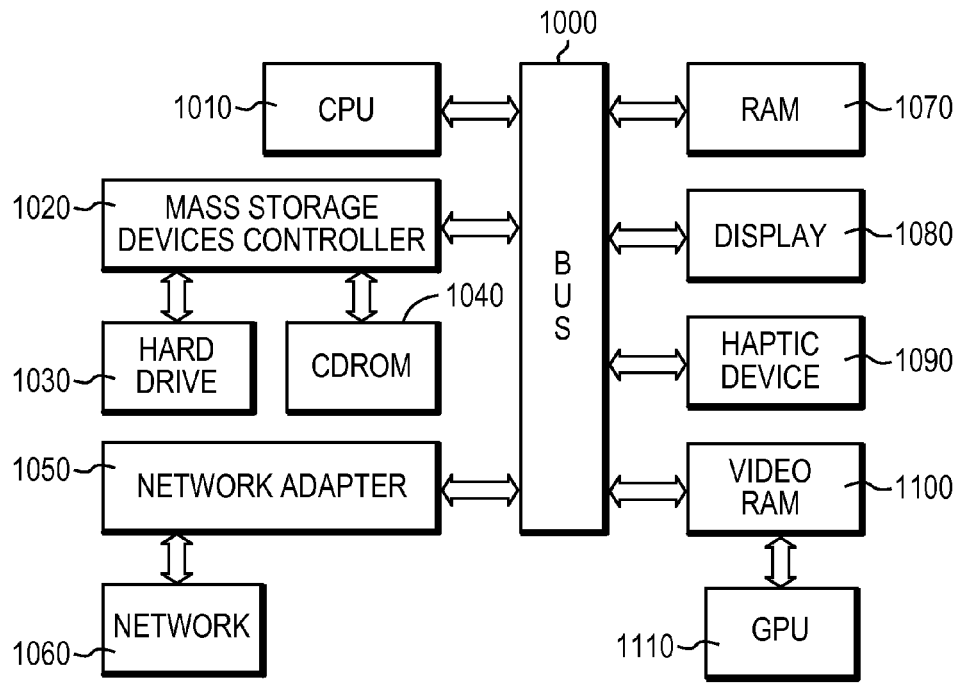
FIG. 11 is a schematic view of a client computer architecture of a user adapted for carrying out the invention.

FIGS. 11 and 12 are schematic views of client and network hardware architecture, adapted for carrying out the invention. FIG. 11 shows a client computer system, e.g. a workstation of a user.

The client computer comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals.

In operation, the various client components of FIG. 10 are processes executed in CPU 1010. Network adapter 1050 is used by vault client 96 for accessing vault server 97 on network 1060 and is further used by database client 93 for accessing database server 94 on network 1060. Mass storage devices controller 1020 may be used by vault client 96 to create a cache of representations on local mass memory device such as hard drive 1030; this improves performances of frequently used representations. Display driver 99 feeds video RAM 1100 with the aggregated geometries of the computed model; the model is displayed thanks to the GPU 1110.

Query engine 92 processes queries and stores results in RAM 1070. Representation loader 95 processes and stores working format of geometries of the computed model in RAM 1070. The stored geometries of the computed model are used by display driver 99 and are sent to the GPU 1110.

FIG. 12 is a schematic view of an embodiment of a network architecture adapted for carrying out the invention; the architecture of FIG. 12 is adapted for allowing various users to carry out the process of the invention, thanks to a common vault server providing a generally accessible database of representations and thanks to a common database server. In the example of FIG. 12, two local area networks (LAN) 121 and 122 are connected in a wide area network (WAN) 1200. FIG. 12 shows database 127 and master vault 128, which are depicted in WAN 1200, for access from LANs 121 and 122. First LAN 121 comprises two clients 123 and 124, and second LAN 122 comprises one client 125.

In operation, clients in one of LANs 121 and 122 access database 127 through WAN 1200. Clients 123 and 124 in first LAN 121 and client 125 in second LAN 122 access directly the master vault 128 for getting objects, all the information on said objects such as geometries.

The preferred embodiment of the present invention has been described. It will be understood that various modifications in form and details may be made without departing from the spirit and scope of the invention. Therefore, other implementations are within the scope of and encompassed by the following claims. For instance, the computing of the model may be carried out at by the PDM system instead of the client computer. Thus, the client computer retrieves the computed model and solely displays views of the model.

What is claimed is:

1. A computer process for displaying an assembly of objects of a product lifecycle management (PLM) database stored on a server, the process comprising:
    using a computer processor:
        providing an access to a server hosting the PLM database;
        selecting, on a client computer, the assembly of objects in the database;
        identifying, on the server, a plurality of viewpoints on said assembly;
        computing, by the server, rays passing through the identified viewpoints and the objects of the assembly of objects;
        identifying, on the server, one or more bounding volumes for each respective object of the assembly of objects intersecting the computed rays;
        retrieving, by the server, from the database geometries of a set of objects of said assembly according to the plurality of identified viewpoints on said assembly and the identified one or more bounding volumes for each respective object, the geometries of the set of objects being retrieved according to the plurality of identified viewpoints and the one or more bounding volumes for each respective object and not according to any certain model;
        computing, at one time by the client computer, a model of said assembly for all the retrieved geometries of the set of objects; and
        displaying, by the client computer, a view of the model, any displayed views being computed locally on a client computer starting from the geometries of the objects retrieved at the retrieving step.

2. The process of claim 1, wherein objects are three-dimensional modeled objects and the computed model of the assembly of objects is a three-dimensional model displayed on a graphical user interface.

3. The process of claim 1, wherein the identified viewpoints are located outside the assembly of objects.

4. The process of claim 1, wherein objects of the retrieved set of objects are visible from viewpoints.

5. The process of claim 1, wherein the step of identifying, on the server, a plurality of viewpoints comprises:
    identifying faces of a bounding volume of the assembly of objects; and
    for each identified face of the bounding volume, identifying at least a viewpoint.

6. The process of claim 5, wherein computed rays pass through said identified faces with an angle of incidence ranging from 0 degree to 45 degrees.

7. The process of claim 1, wherein, at the step of displaying, the view of the model is a non-associative view.

8. The process of claim 7, further comprising, prior to the step of displaying, a step of:
    aggregating the objects of the retrieved set of objects to form the non-associative view.

9. The process of claim 8, wherein geometries of the objects of the retrieved set of objects are aggregated.

10. The process of claim 1, wherein the step of selecting, on the client computer, the assembly of objects further comprises:
    selecting, on the client computer, a precision of the displayed view of the model.

11. The process of claim 10, wherein the selected precision is proportional to a ratio between a number of rays passing through an identified face of a bounding volume of the assembly of objects and the surface of the identified face.

12. The process of claim 10, wherein the precision is selected among one of the following:
    a default value;
    a value selected by the user;
    a value determined according to at least one parameter of a network;
    a value determined according to at least one parameter of a computer.

13. The process of claim 10, wherein there are a number of rays passing through respective identified faces of a bounding volume of the assembly of objects, and the number of rays for each identified face is computed according to the selected precision.

14. The process of claim 1, wherein the step of selecting, on the client computer, the assembly of objects further comprises:
    selecting, on the client computer, a configuration of the assembly.

15. The process of the claim 1, wherein the step of retrieving, by the server, from the database the set of objects is carried out according to security context of the user.

16. A computer program product comprising: a non-transitory computer readable medium having a computer program stored thereon for displaying an assembly of objects of a product lifecycle management (PLM) database stored on a server; and
    the computer program causing a client computer to:
        provide an access to the PLM database;
        select the assembly of objects in the database;
    the computer program causing the server to:
        identify a plurality of viewpoints on said assembly;
        compute rays passing through the identified viewpoints and the objects of the assembly of objects;

identify one or more bounding volumes for each respective object of the assembly of objects intersecting the computed rays;

retrieve from the database geometries of a set of objects of said assembly according to the plurality of identified viewpoints on said assembly and the identified one or more bounding volumes for each respective object, the retrieved geometries of the set of objects being according to the plurality of identified viewpoints and the identified one or more bounding volumes for each respective object and not according to any certain model;

and further causing the client computer to:

compute, at one time by the client computer, a model of said assembly for all the retrieved geometries of the set of objects; and display a view of the model, any displayed views being computed locally on a client computer starting from the geometries of the objects retrieved.

17. The computer program product of claim 16, wherein the computer program further causes the server to:

when identifying a plurality of viewpoints:

identify faces of a bounding volume of the assembly of objects; and for each identified face of the bounding volume, identify at least a viewpoint.

18. A computer system for displaying on a client computer an assembly of objects of a product lifecycle management (PLM) database stored on a server, the system comprising:

a product lifecycle management database hosted by the server;

the server and the client computer each comprising a respective computer processor, said client computer processor configured to:

provide an access to the database;

select the assembly of objects in the database;

said server computer processor configured to:

identify a plurality of viewpoints on said assembly;

compute rays passing through the identified viewpoints and the objects of the assembly of objects;

identify one or more bounding volumes for each respective object of the assembly of objects intersecting the computed rays;

retrieve from the database geometries of a set of objects of said assembly according to the plurality of identified viewpoints on said assembly, such that the retrieved geometries of the set of objects is according to the plurality of identified viewpoints and the identified one or more bounding volumes for each respective object and not according to any certain model; and and said client computer processor further configured to:

compute at one time a model of said assembly for all the retrieved geometries of the set of objects; and display a view of the model, any displayed views being computed locally on a client computer starting from the geometries of the objects retrieved from the database.

19. The apparatus of claim 18, wherein the server computer processor is further configured to:

when identifying a plurality of viewpoints:

identify faces of a bounding volume of the assembly of objects; and for each identified face of the bounding volume, identify at least a viewpoint.

* * * * *